(12) United States Patent  
Obata

(10) Patent No.: US 10,162,466 B2
(45) Date of Patent: Dec. 25, 2018

(54) PORTABLE DEVICE AND METHOD OF MODIFYING TOUCHED POSITION

(71) Applicant: KYOCERA CORPORATION, Kyoto (JP)

(72) Inventor: Takanori Obata, Suita (JP)

(73) Assignee: KYOCERA CORPORATION, Kyoto (JP)

(*) Notice: Subject to any disclaimer, the term of this patent is extended or adjusted under 35 U.S.C. 154(b) by 3 days.

(21) Appl. No.: 15/222,798

(22) Filed: Jul. 28, 2016

(65) Prior Publication Data

US 2016/0334936 A1    Nov. 17, 2016

Related U.S. Application Data

(63) Continuation of application No. PCT/JP2015/052472, filed on Jan. 29, 2015.

(30) Foreign Application Priority Data

Jan. 29, 2014 (JP) .................................. 2014-014489

(51) Int. Cl.
*G06F 3/041* (2006.01)
*G06F 3/044* (2006.01)
*G06F 1/16* (2006.01)

(52) U.S. Cl.
CPC .......... *G06F 3/0418* (2013.01); *G06F 1/1626* (2013.01); *G06F 1/1643* (2013.01); *G06F 1/1652* (2013.01); *G06F 3/041* (2013.01); *G06F 3/044* (2013.01); *G06F 3/0412* (2013.01); *G06F 2203/04102* (2013.01); *G06F 2203/04108* (2013.01)

(58) Field of Classification Search
CPC ........ G06F 3/041; G06F 3/044; G06F 3/0412; G06F 2203/04108; G06F 2203/04102
See application file for complete search history.

(56) References Cited

U.S. PATENT DOCUMENTS

| | | | | |
|---|---|---|---|---|
| 2012/0032891 | A1* | 2/2012 | Parivar | G06F 3/04883 345/173 |
| 2012/0249459 | A1 | 10/2012 | Sashida et al. | |
| 2015/0015511 | A1* | 1/2015 | Kwak | G06F 3/0416 345/173 |
| 2015/0185949 | A1* | 7/2015 | Oh | G06F 3/0488 345/173 |

FOREIGN PATENT DOCUMENTS

JP    2012-203895 A    10/2012

* cited by examiner

*Primary Examiner* — Dennis Joseph
(74) *Attorney, Agent, or Firm* — Duane Morris LLP

(57) ABSTRACT

A portable device includes a display, a touch panel including at least one curved area, and at least one processor. The at least one processor is configured to, when a touched position on the touch panel is within the curved area, determine a direction from which a touched position indicator has approached the curved area, and modify the touched position based on the determined direction.

10 Claims, 12 Drawing Sheets

HOME SCREEN

TOUCH IN DIRECTION TOWARD FRONT SURFACE

TOUCH IN DIRECTION TOWARD SIDE SURFACE

TOUCH FROM DIAGONALLY ABOVE

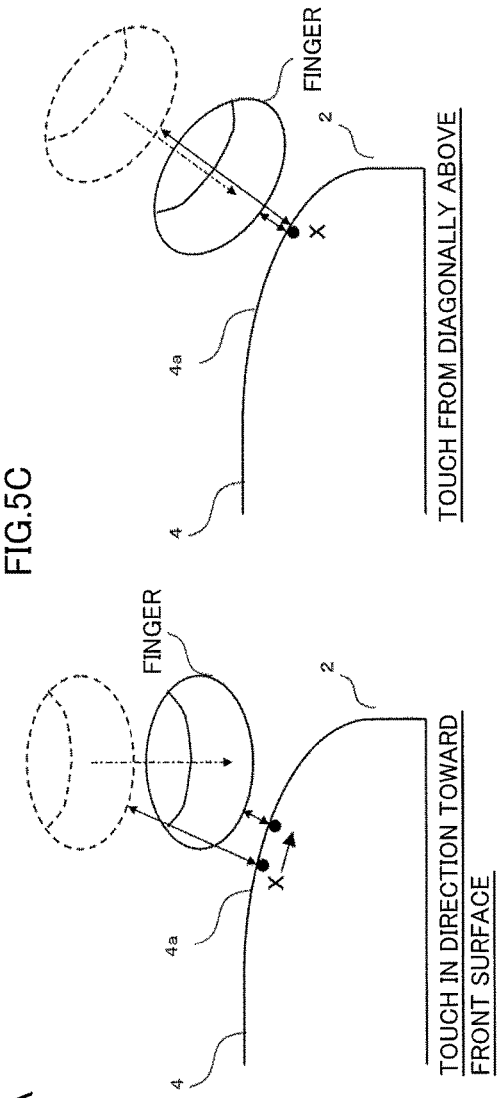
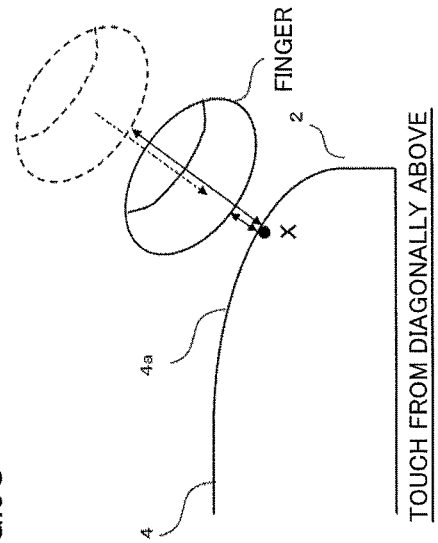
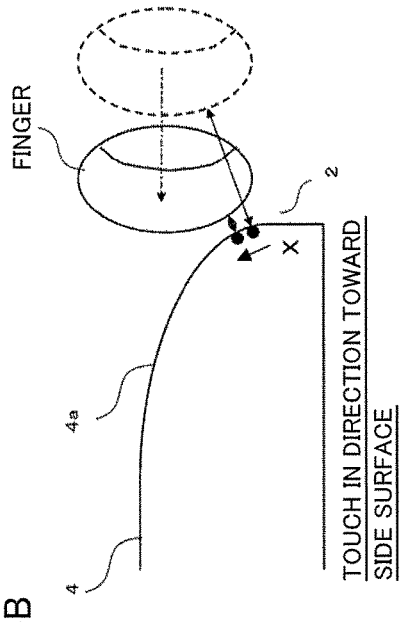

SETTING SCREEN

PORTABLE DEVICE AND METHOD OF MODIFYING TOUCHED POSITION

CROSS-REFERENCE TO RELATED APPLICATION

The present application is a continuation based on PCT Application No. PCT/JP2015/052472 filed on Jan. 29, 2015, which claims the benefit of Japanese Application No. 2014-014489, filed on Jan. 29, 2014. PCT Application No. PCT/JP2015/052472 is entitled "Portable Device and Touch Position Correction Method", and Japanese Application No. 2014-014489 is entitled "Portable Device, Touch Position Correction Method and Program," and the contents of each application are incorporated by reference herein in their entireties.

FIELD

The present disclosure relates to a portable device, and more particularly to a portable device including a touch panel. The present disclosure also relates to a method of modifying a touched position which can be used in such a portable device.

BACKGROUND

Conventionally, a mobile phone with a display located on the front surface side of a housing is known. A touch panel is located to overlap this display, and various types of application programs are executed based on user's touch operations on the display.

Some of such mobile phones are configured such that ends of the housing on the front surface have a curved shape in terms of design.

SUMMARY

A first aspect of the present disclosure relates to a portable device. The portable device includes a display, a touch panel including at least one curved area, and at least one processor. The at least one processor is configured to determine, when a touched position on the touch panel is within the curved area, a direction from which a touched position indicator has approached the curved area, and modify the touched position based on the determined direction.

A second aspect of the present disclosure relates to a touched position modification method for modifying a touched position touched with a touched position indicator. The touched position is detected by a touch panel. The touch panel includes at least one curved area. The touched position modification method includes determining, when the touched position is within the curved area, a direction from which the touched position indicator has approached the curved area and modifying the touched position based on the determined direction.

A third aspect of the present disclosure relates to a portable device. The portable device includes a display, a touch panel including at least one curved area, and at least one processor. The at least one processor is configured to modify, when a touched position on the touch panel is within the curved area, the touched position based on a direction from which a touched position indicator has approached the curved area.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIGS. 5A to 5C respectively show the movement of the closest position on a touch panel brought closest to the finger while the finger is approaching the touch panel, when the finger touches the curved area of the touch panel in the direction toward the front surface of, in the direction toward the side surface of, and from diagonally above a cabinet, according to a first example.

DETAILED DESCRIPTION

Figure 1:
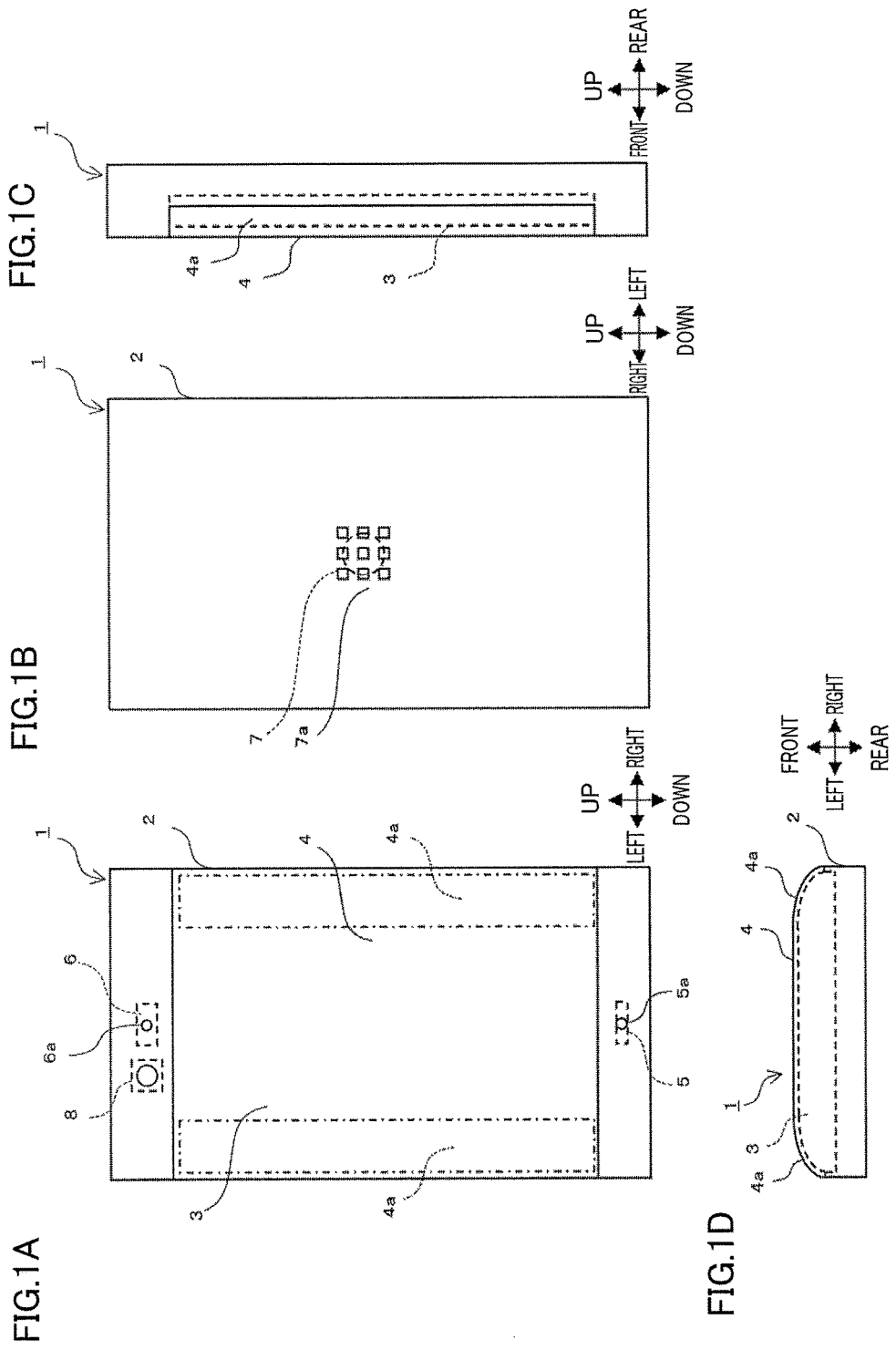
FIGS. 1A to 1D respectively show a front view, a rear view, a right side view, and a bottom view of a mobile phone, according to an embodiment.

Hereinafter, some embodiments will be described with reference to the drawings.

<Configuration of Mobile Phone>

Some mobile phones are configured such that ends of the housing on the front surface have a curved shape in terms of design. In recent years, it has become technically possible to curve a display and a touch panel. It is thus assumed that the display and the touch panel will be extended to the ends having a curved shape. When at least a part of the touch panel includes a curved area, and when the curved area is touched with a finger, a displacement is likely to occur between a target touched position at which a user intends to touch and an actual touched position at which the user actually touches. A mobile phone according to some embodiments of the disclosure can modify the displacement.

FIGS. 1A to 1D respectively show a front view, a rear view, a right side view, and a bottom view of a mobile phone 1. Hereinafter, as shown in FIGS. 1A to 1D, the longer direction of a cabinet 2 is defined as the up/down direction, and the shorter direction of cabinet 2 is defined as the left/right direction, for ease of description. The direction perpendicular to these up/down and left/right directions is defined as the front/rear direction.

As shown in FIGS. 1A to 1D, mobile phone 1 includes cabinet 2, a display 3, a touch panel 4, a microphone 5, a conversation speaker 6, an external speaker 7, and a camera 8.

Cabinet 2 may have a substantially rectangular profile, as seen in the direction toward the front surface. As shown in FIG. 1D, the both ends of the front surface of cabinet 2 may have a curved shape which are bent so as to be lowered from the inner side to the outer side in the front/rear direction. Display 3 may be located on the front surface of cabinet 2. Various types of images (screens) can be displayed on display 3. Display 3 extends to both the right and left ends of cabinet 2, and may also have a curved shape at the both ends similarly to the both ends of cabinet 2. Display 3 may be a liquid crystal display, and includes a liquid crystal panel and an LED back light which illuminates the liquid crystal panel. Display 3 may be a display of another type, such as an organic electroluminescence display.

Touch panel 4 can be located to overlap display 3. Touch panel 4 can be a transparent sheet. Touch panel 4 can have a curved shape at the both ends so as to correspond to the both ends of display 3. Touch panel 4 can have a curved area 4a at each of the both ends. The remaining portion of touch panel 4 other than the both ends can have a flat shape. In an embodiment, touch panel 4 may be a capacitance type touch panel. As touch panel 4, various types of touch panels, such as ultrasonic type, pressure-sensitive type, resistive film type, and optical sensing type touch panels, may be used instead of a capacitance type touch panel.

Microphone 5 can be located at the lower end within cabinet 2 in the up/down direction. Conversation speaker 6 can be located at the upper end within cabinet 2. Microphone 5 can receive voice passed through a microphone hole 5a present in the front surface of cabinet 2. Microphone 5 can generate an electrical signal in accordance with received sound. Conversation speaker 6 can output sound. The output sound may be emitted out of cabinet 2 through an output hole 6a present in the front surface of cabinet 2. At the time of a call, received voice from a device of a communication partner (mobile phone etc.) can be output through conversation speaker 6, and user's uttered voice can be input to microphone 5. The sound may include various types of sound, such as voice and an audible alert.

External speaker 7 can be located within cabinet 2. An output hole 7a can be present in the rear surface of cabinet 2 in a region facing external speaker 7. Sound output through external speaker 7 can be emitted out of cabinet 2 through output hole 7a.

At the upper part of cabinet 2 in the up/down direction, a camera 8 can be located on the front surface side. Camera 8 can capture an image of a subject present on the front surface side of mobile phone 1. Camera 8 can include an imaging device, such as a CCD (Charge Coupled Device) or a CMOS (Complementary Metal Oxide Semiconductor) sensor, and a lens for imaging an image of a subject on the imaging device.

Figure 2:
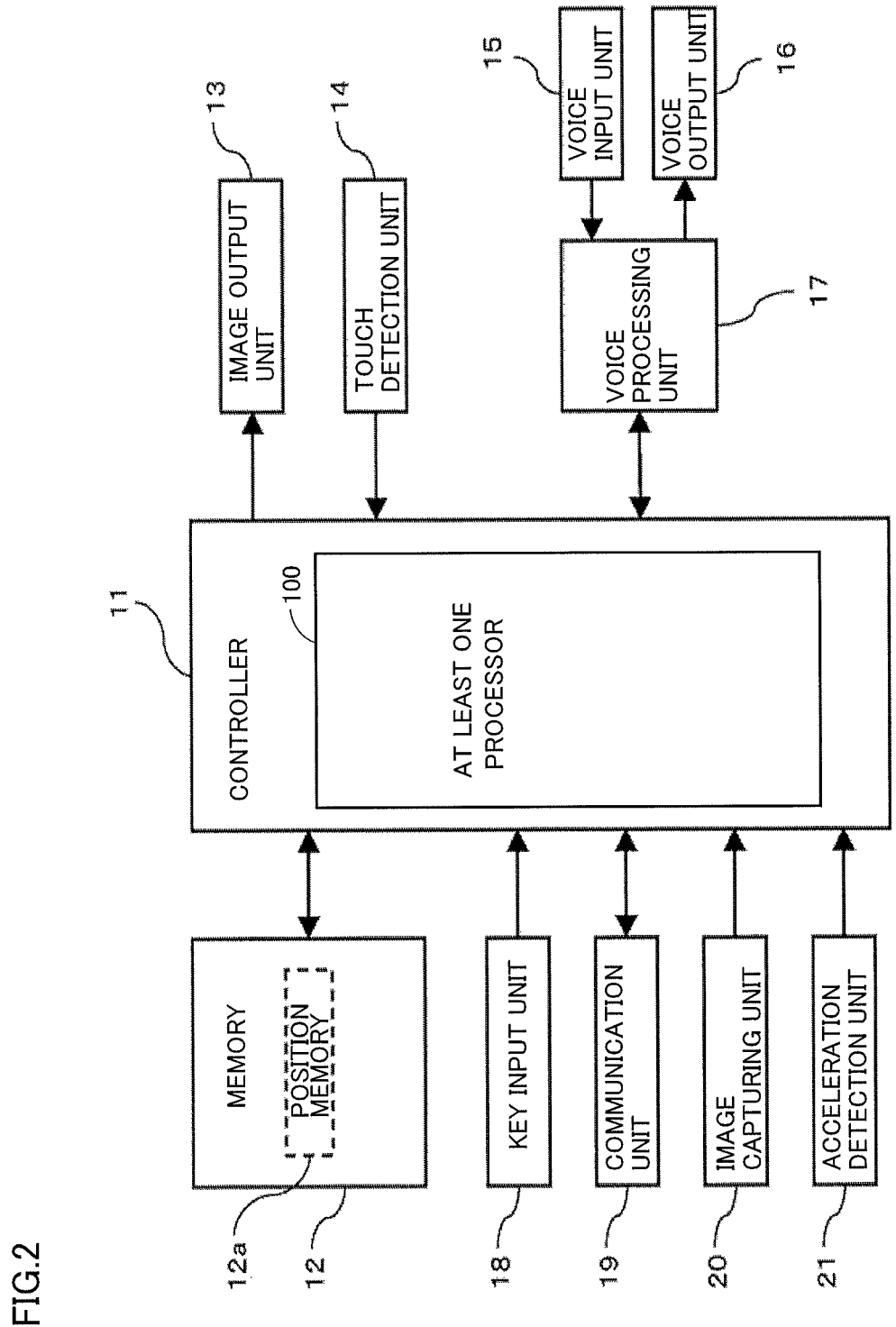
FIG. 2 is a block diagram showing an example of an overall configuration of a mobile phone according to an embodiment.

FIG. 2 is a block diagram showing an example of an overall configuration of mobile phone 1.

As shown in FIG. 2, mobile phone 1 includes a controller 11, a memory 12, an image output unit 13, a touch detection unit 14, a voice input unit 15, a voice output unit 16, a voice processing unit 17, a key input unit 18, a communication unit 19, an image capturing unit 20, and an acceleration detection unit 21.

Memory 12 can include a ROM (Read Only Memory), a RAM (Random Access Memory), and an external memory. Memory 12 can have various types of programs stored therein. The programs stored in memory 12 can include various application programs (hereinafter briefly referred to as "applications"), for example, applications for telephone, message, camera, web browser, map, game, schedule management, and the like, in addition to a control program for controlling each unit of mobile phone 1. The programs stored in memory 12 can also include a program for executing a process of modifying a touched position which will be described later. The programs can be stored in memory 12 by a manufacturer during manufacture of mobile phone 1, or can be stored in memory 12 through a communication network or storage medium, such as a memory card or a CD-ROM (Compact Disc Read Only Memory).

Memory 12 can also include a working area for storing data temporarily utilized or generated while a program is executed.

Memory 12 can include a position memory 12a. Position memory 12a can chronologically store positions on touch panel 4 to which the finger is brought closest as closest positions X while a user's finger is approaching touch panel 4.

Controller 11 includes at least one processor 100. In accordance with various embodiments, the at least one processor 100 may be implemented as a single integrated circuit (IC) or as multiple communicatively coupled IC's and/or discrete circuits. It is appreciated that the at least one processor 100 can be implemented in accordance with various known technologies. In one embodiment, the processor 100 includes one or more circuits or units configurable to perform one or more data computing procedures or processes by executing instructions stored in an associated memory, for example. In other embodiments, the processor 100 may be implemented as firmware (e.g. discrete logic components) configured to perform one or more data computing procedures or processes. For example, the processor 100 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein. The at least one processor can control each unit of mobile phone 1 (memory 12, image output unit 13, touch detection unit 14, voice input unit 15, voice output unit 16, voice processing unit 17, key input unit 18, communication unit 19, image capturing unit 20, acceleration detection unit 21, and the like) in accordance with the control program stored in memory 12.

Image output unit 13 can include display 3 shown in FIG. 1A. Image output unit 13 can cause display 3 to present an image (screen) based on a control signal and an image signal received from controller 11. Image output unit 13 can turn on, turn off, and adjust brightness of, display 3 in response to control signals received from controller 11.

Touch detection unit 14 can include touch panel 4 shown in FIG. 1A, and can detect a touch operation on touch panel 4. More specifically, touch detection unit 14 can detect a position (hereinafter referred to as a "touched position") at which a contact object, such as a user's finger, contacts touch panel 4. Touch detection unit 14 can output a position signal generated based on a detected touched position to controller 11 as a touched position. A touch operation on touch panel 4 is performed on a screen or an object image displayed on display 3, and can be rephrased as being a touch operation on display 3.

When the front surface of cabinet 2 including touch panel 4 is covered with a transparent cover made of glass or the like, a finger which is going to be brought into contact with touch panel 4 contacts the cover, rather than touch panel 4. In this case, touch panel 4 can detect a touched position when the finger contacts the cover. When there is a cover in this way, touch panel 4 will be indirectly touched with a finger. Touch panel 4 may be touched directly or indirectly. In either case, the fact remains that touch panel 4 is touched with a finger.

A user can perform various touch operations on display 3 by touching touch panel 4 with his/her finger. The touch operation can include a tap operation, a flick operation, a sliding operation, and the like, for example. The tap operation is an operation that a user contacts touch panel 4 with his/her finger, and then lifts the finger from touch panel 4 after a short period of time. The flick operation is an operation that a user contacts touch panel 4 with his/her finger, and then flicks or sweeps touch panel 4 with the finger in any direction. The sliding operation is an operation that a user moves his/her finger in any direction with the finger kept in contact with touch panel 4.

For example, in the case where touch detection unit 14 detects a touched position, and when the touched position is no longer detected within a predetermined first time period after the touched position is detected, controller 11 can determine that the touch operation is a tap operation. In the case where a touched position is moved by a predetermined first distance or more within a predetermined second time period after the touched position is detected, and then the touched position is no longer detected, controller 11 can determine that the touch operation is a flick operation. When a touched position is moved by a predetermined second distance or more after the touched position is detected, controller 11 can determine that the touch operation is a sliding operation.

When touch panel 4 is of capacitance type, and a finger approaches touch panel 4 to some extent, the capacitance starts to change at an approached position (a detection point). As the finger approaches touch panel 4, the change in capacitance at the position increases, and when the finger touches the position, the amount of change in capacitance exceeds a detection threshold value for determining a touch. Touch detection unit 14 can detect, as a touched position, a position on touch panel 4 where the amount of change in capacitance has exceeded the detection threshold value, and can output a touched position signal. Touch detection unit 14 can detect, as a close position, a position on touch panel 4 where a change in capacitance has occurred, and can output to controller 11 a close position signal indicating the close position and the amount of change in capacitance at that close position.

Voice input unit 15 can include microphone 5. Voice input unit 15 can output an electrical signal from microphone 5 to voice processing unit 17.

Voice output unit 16 can include conversation speaker 6 and external speaker 7. An electrical signal received from voice processing unit 17 can be input to voice output unit 16. Voice output unit 16 can cause sound to be output through conversation speaker 6 or external speaker 7.

Voice processing unit 17 can perform A/D conversion or the like on an electrical signal received from voice input unit 15, and can output a digital audio signal after conversion to controller 11. Voice processing unit 17 can perform decoding and D/A conversion or the like on a digital audio signal received from controller 11, and can output an electrical signal after conversion to voice output unit 16.

Key input unit 18 can include at least one or more hard keys. For example, key input unit 18 can include a power key for turning on mobile phone 1, and the like. Key input unit 18 can output a signal corresponding to a pressed hard key to controller 11.

Communication unit 19 can include a circuit for converting a signal, an antenna that transmits/receives electric waves, and the like, in order to make calls and communications. Communication unit 19 can convert a signal for a call or communication received from controller 11 into a radio signal, and can transmit the converted radio signal to a communication destination, such as a base station or another communication device, through the antenna. Communication unit 19 can convert a radio signal received through the antenna into a signal in the form that can be utilized by controller 11, and can output the converted signal to controller 11.

Image capturing unit 20 can include camera 8 shown in FIG. 1A, an image capturing control circuit, and the like. Image capturing unit 20 can perform various types of image processing on image data of an image captured with camera 8, and can output the image data after image processing to controller 11.

Acceleration detection unit 21 can include a three-axis accelerometer. The three-axis accelerometer can detect the gravitational accelerations occurred in mobile phone 1 in the three directions of the front/rear, up/down and left/right directions. Acceleration detection unit 21 can output to controller 11 an acceleration signal indicating the acceleration based on the posture of mobile phone 1 (cabinet 2) detected by three-axis accelerometer.

Figure 3:
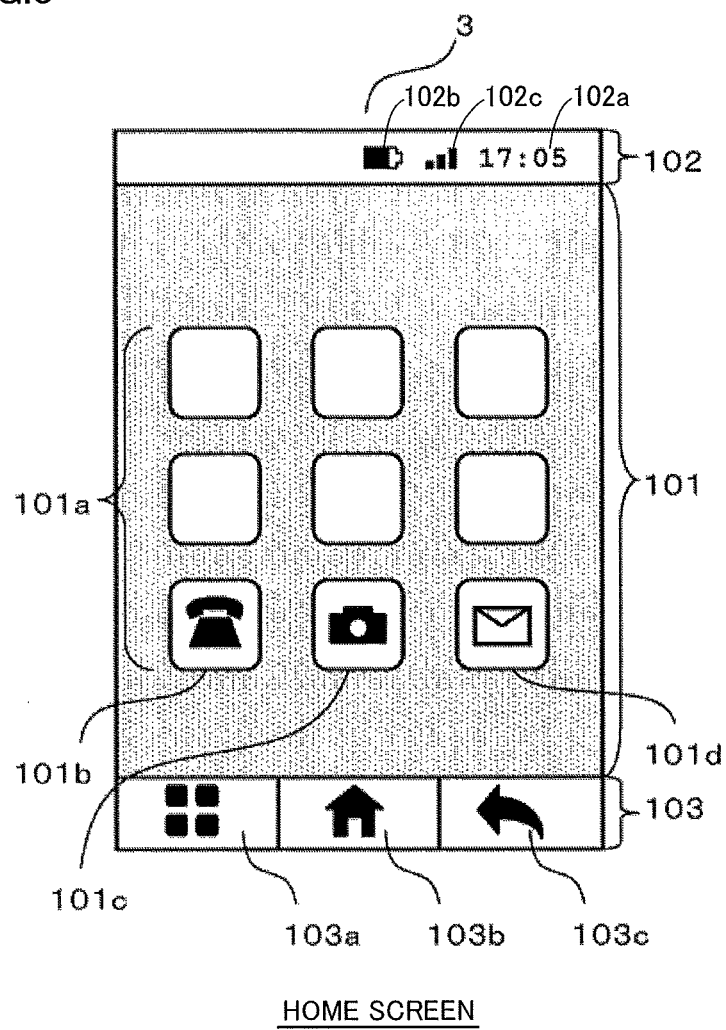
FIG. 3 shows a display with a home screen displayed thereon, according to an embodiment.

FIG. 3 shows display 3 with a home screen 101 displayed thereon.

In mobile phone 1, various screens can be displayed on display 3, and a user can perform various touch operations on each screen. For example, home screen 101 can be displayed on display 3 as an initial screen. As shown in FIG. 3, home screen 101 can include start-up icons 101a for starting up various types of applications, respectively. Start-up icons 101a can include, for example, a telephone icon 101b, a camera icon 101c, an e-mail icon 101d, and the like.

A notification bar 102 and an operation key group 103 can be displayed on display 3 in addition to home screen 101. Notification bar 102 can be displayed above home screen 101. Notification bar 102 can include a current time 102a, a capacity meter 102b indicating the battery capacity, a strength meter 102c indicating the strength of electric waves, and the like. Operation key group 103 can be displayed under home screen 101. Operation key group 103 can include a setting key 103a, a home key 103b and a back key 103c, for example. Setting key 103a can mainly cause display 3 to display a setting screen for performing various types of setting. Home key 103b can mainly cause the screen of display 3 to shift to home screen 101 from another screen. Back key 103c can mainly return the executed processing to processing of an immediately preceding step.

When using each application, a user can perform a tap operation on start-up icon 101a corresponding to an application to be used. When the application is started up, an execution screen based on the application can be displayed. Even when the execution screen of the started-up application is displayed or even when the execution screen transitions as the application proceeds, notification bar 102 and operation key group 103 can be continuously displayed on display 3.

As described above, in mobile phone 1, touch panel 4 can include curved area 4a at each of its both ends. When curved area 4a is touched with a finger, a displacement is likely to occur between a target touched position a user intends to touch and an actual touched position at which the user actually touches.

Figure 4A:
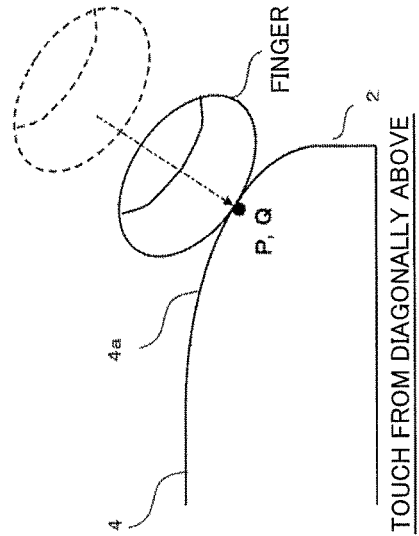
FIGS. 4A to 4C respectively show how a curved area of a touch panel is touched with a finger in a direction toward a front surface of, in a direction toward a side surface of, and from diagonally above a touch panel, according to an embodiment.
Figure 4B:
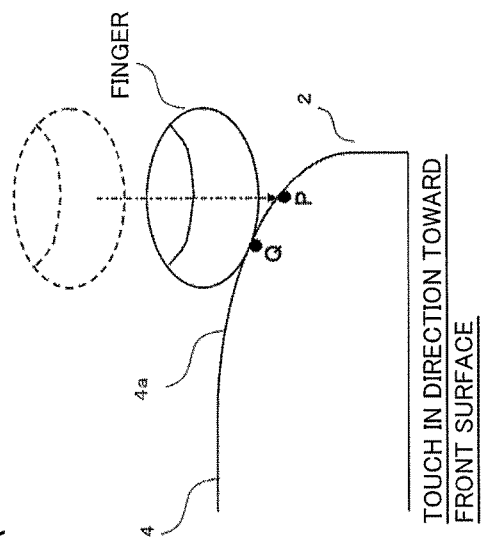
Figure 4C:
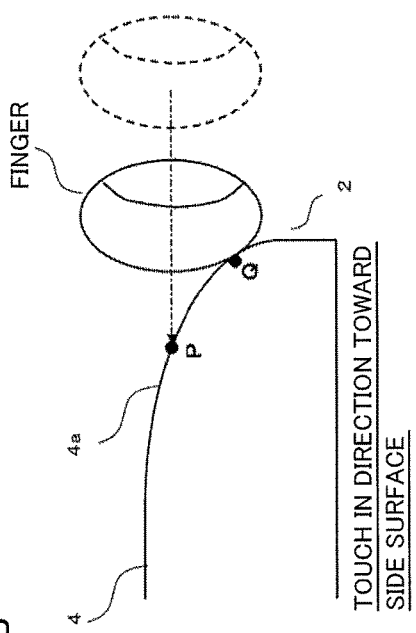

FIGS. 4A to 4C respectively show how curved area 4a of touch panel 4 is touched with a finger in the direction toward the front surface of, in the direction toward the side surface of, and from diagonally above touch panel 4. As shown in FIG. 4A, when curved area 4a is touched with a finger in the direction toward the front surface of cabinet 2, an actual touched position Q is displaced from target touched position P to the inner side of touch panel 4. As shown in FIG. 4B, when curved area 4a is touched with a finger in the direction toward the side surface of cabinet 2, actual touched position Q is displaced from target touched position P to the outer side of touch panel 4. As shown in FIG. 4C, when curved area 4a is touched with a finger from diagonally above cabinet 2 (in the normal direction with respect to the curved surface), target touched position P and actual touched position Q are substantially identical.

When actual touched position Q is displaced from target touched position P, it may be desirable to modify actual touched position Q to be closer to target touched position P. As described above, however, since how a touched position is displaced (whether or not there is a displacement and the direction of displacement) differs among the directions in which a finger approaches touch panel 4, actual touched position Q cannot be modified uniformly.

In mobile phone 1, when curved area 4a is touched with a finger, controller 11 can perform a touched position modification process for modifying the touched position based on the direction in which the finger approaches touch panel 4. The program stored in memory 12 can impart the function for modifying a touched position to controller 11. The touched position modification process can be executed with this function.

Hereinafter, specific examples of the touched position modification process will be described.

First Example

FIGS. 5A to 5C respectively show the movement of closest position X on touch panel 4 brought closest to the finger while the finger is approaching touch panel 4, when the finger touches curved area 4a of touch panel 4 in the direction toward the front surface of, in the direction toward the side surface of, and from diagonally above cabinet 2. As shown in FIG. 5A, when curved area 4a is touched with the finger in the direction toward the front surface of cabinet 2, closest position X moves from the inner side to the outer side of touch panel 4 as the finger approaches curved area 4a. As shown in FIG. 5B, when curved area 4a is touched with the finger in the direction toward the side surface of cabinet 2, closest position X moves from the outer side to the inner side of touch panel 4 as the finger approaches curved area 4a. As shown in FIG. 5C, when curved area 4a is touched with the finger from diagonally above cabinet 2, closest position X hardly moves.

In the first example, the direction in which the finger approaches can be presumed based on the movement of closest position X, and a touched position can be modified based on the presumed approach direction.

Figure 6:
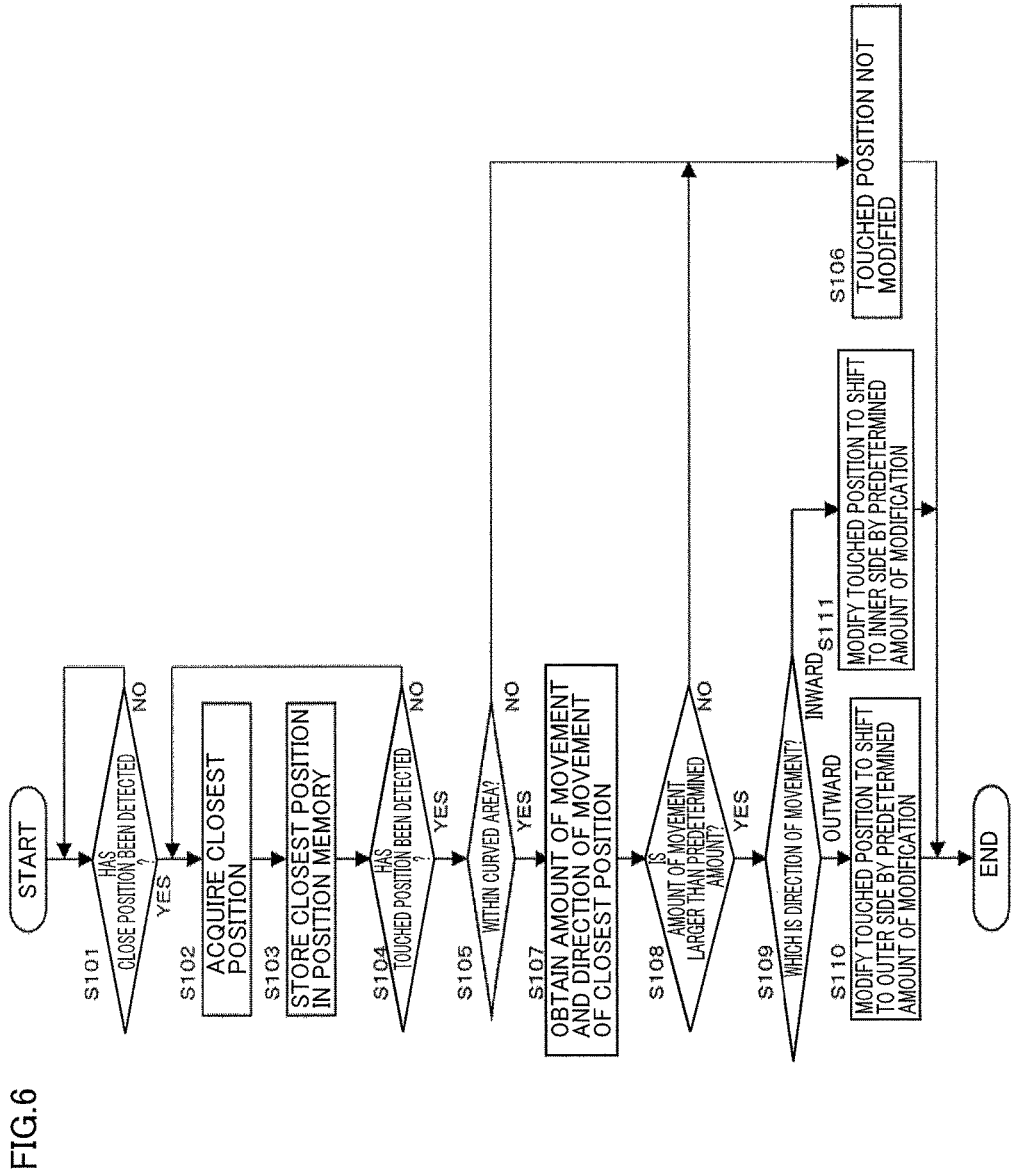
FIG. 6 is an example of a flowchart showing a process of modifying a touched position according to the first example.

FIG. 6 is an example of a flowchart showing a process of modifying a touched position according to the first example.

Controller 11 can determine whether or not a close position on touch panel 4 has been detected by touch detection unit 14 (S101). When a user brings his/her finger closer to touch panel 4 for touching touch panel 4, a close position can be soon detected by touch detection unit 14. When the close position has been detected (YES in S101), controller 11 can acquire, as closest position X, a close position at which the change in capacitance is largest (a close position at which the finger is closest to touch panel 4) from among detected close positions (S102), and can cause position memory 12a to store acquired closest position X (S103).

Next, controller 11 can determine whether or not the touched position has been detected by touch detection unit 14 (S104). If a touched position has not been detected (NO in S104), controller 11 can return the process to step S102, and can acquire closest position X again (S102). Closest positions X can thus be acquired until a touched position is detected, and acquired closest positions X can be chronologically stored in position memory 12a.

When touch panel 4 is touched with a user's finger, a touched position can be detected by touch detection unit 14. When the touched position has been detected (YES in S104), controller 11 can determine whether or not the touched position is within curved area 4a (S105). If the touched position is not within curved area 4a (NO in S105), controller 11 can terminate the touched position modification process, without modifying the touched position (S106). If the touched position is within curved area 4a (YES in S105), controller 11 can obtain the amount of movement and the direction of movement of closest position X in the course during which curved area 4a is touched with the finger, based on closest positions X stored in position memory 12 (S107). Controller 11 can then determine whether or not the obtained amount of movement is larger than a predetermined amount (S108).

When the amount of movement is less than or equal to the predetermined amount, it can be presumed that the finger has approached curved area 4a from diagonally above cabinet 2, as shown in FIG. 5C, because closest position X remains at substantially the same position. When curved area 4a is touched with the finger from diagonally above cabinet 2, actual touched position Q and target touched position P are substantially identical as shown in FIG. 4C. When it is determined that the amount of movement is less than or equal to the predetermined amount (NO in S108), controller 11 can terminate the touched position modification process, without modifying the touched position (S106).

When it is determined that the amount of movement is larger than the predetermined amount (YES in S108), controller 11 can determine whether the direction of movement of closest position X is from the inner side to the outer side of touch panel 4 (outward direction) or from the outer side to the inner side of touch panel 4 (inward direction) (S109).

When the direction of movement of closest position X is the outward direction, it can be presumed that the finger has approached curved area 4a in the direction toward the front surface of cabinet 2 as shown in FIG. 5A. When the finger touches curved area 4a in the direction toward the front surface of cabinet 2, actual touched position Q is displaced from target touched position P to the inner side of touch panel 4, as shown in FIG. 4A. When it is determined that the direction of movement of closest position X is the outward direction (S109: outward), controller 11 can modify the detected touched position so as to shift to the outer side by a predetermined amount of modification (S110). The touched position after modification is closer to a user's target touched position. In this case, the amount of modification may be determined previously.

When the direction of movement of closest position X is the inward direction, it can be presumed that the finger has approached curved area 4a in the direction toward the side surface of cabinet 2 as shown in FIG. 5B. When the finger touches curved area 4a in the direction toward the side surface of cabinet 2, actual touched position Q is displaced from target touched position P to the outer side of touch panel 4, as shown in FIG. 4B. When it is determined that the direction of movement of closest position X is the inward direction (S109: inward), controller 11 can modify the detected touched position so as to shift to the inner side by a predetermined amount of modification (S111). The touched position after modification is closer to a user's target touched position.

Having modified the touched position (S110, S111), controller 11 can terminate the touched position modification process. When terminating the touched position modification process, controller 11 can cause closest positions X stored in position memory 12a to be deleted.

As described above, according to the first example, when curved area 4a of touch panel 4 is touched with a finger, the touched position can be modified based on the direction from which the finger has approached. The touched position can be modified properly based on how curved area 4a has been touched.

Second Example

Figure 7A:
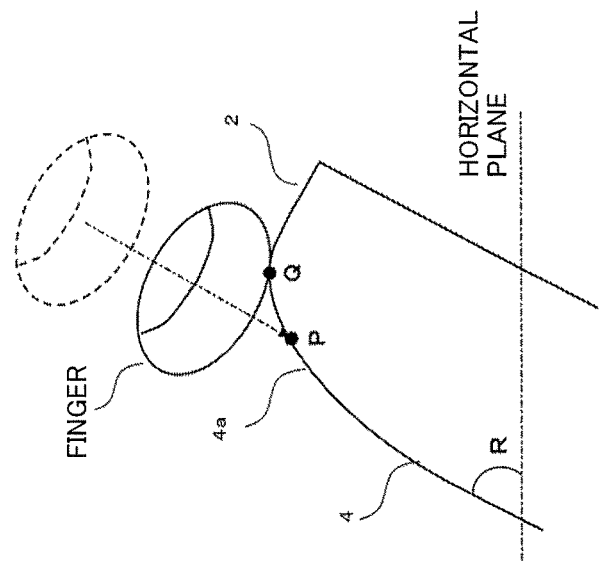
FIGS. 7A to 7C are explanatory views of the relation between the posture of a cabinet and the direction in which a finger is brought closer to the curved area of a touch panel, according to a second example.
Figure 7C:
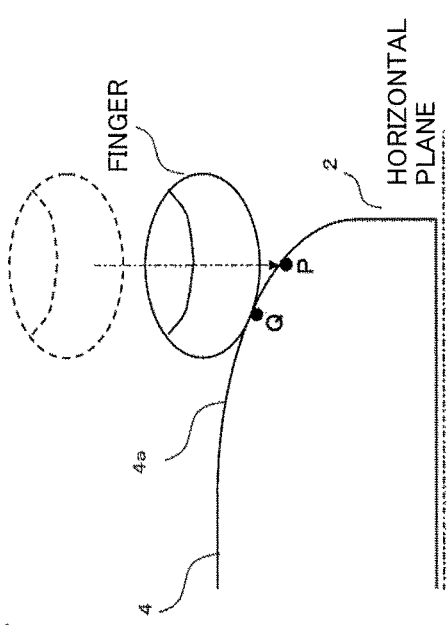
Figure 7B:
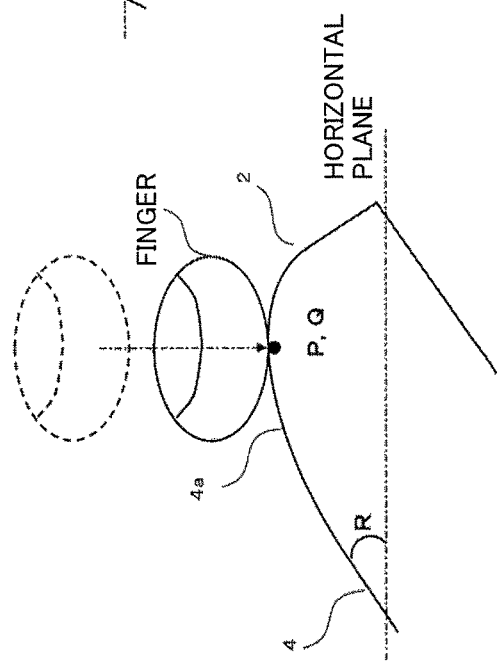

FIGS. 7A to 7C are explanatory views of the relation between the posture of cabinet 2 and the direction in which a finger is brought closer to curved area 4a of touch panel 4.

When a user makes an operation on display 3 looking at display 3 from the front surface, mobile phone 1 may be held by the user such that cabinet 2 is not substantially inclined from the horizontal plane with respect to the left/right direction (the direction in which curved area 4a is curved) as shown in FIG. 7A. When curved area 4a is touched without inclining cabinet 2 in the left/right direction, it is considered that a finger is often brought closer to curved area 4a in the direction toward the front surface of cabinet 2, as shown in FIG. 7A.

When an object image to be subjected to an operation, such as an icon, is displayed in an area of display 3 overlapping curved area 4a, and when an operation is performed on the object image, mobile phone 1 may be held by a user such that cabinet 2 is inclined from the horizontal plane with respect to the left/right direction in order to make the object image readily visible. When curved area 4a is touched with cabinet 2 inclined in the left/right direction, it is considered that a finger is often brought closer to curved area 4a in the direction toward the side surface of or from diagonally above cabinet 2, as shown in FIGS. 7B and 7C. It is considered that particularly when an inclination angle R of cabinet 2 is large as shown in FIG. 7B, a finger is often brought closer to curved area 4a in the direction toward the side surface, and when inclination angle R of cabinet 2 is small as shown in FIG. 7C, a finger is often brought closer to curved area 4a from diagonally above.

In the second example, the direction in which a finger approaches can be presumed based on the state of inclination of cabinet 2 from the horizontal plane with respect to the left/right direction, and the touched position can be modified based on the presumed approach direction.

Figure 8:
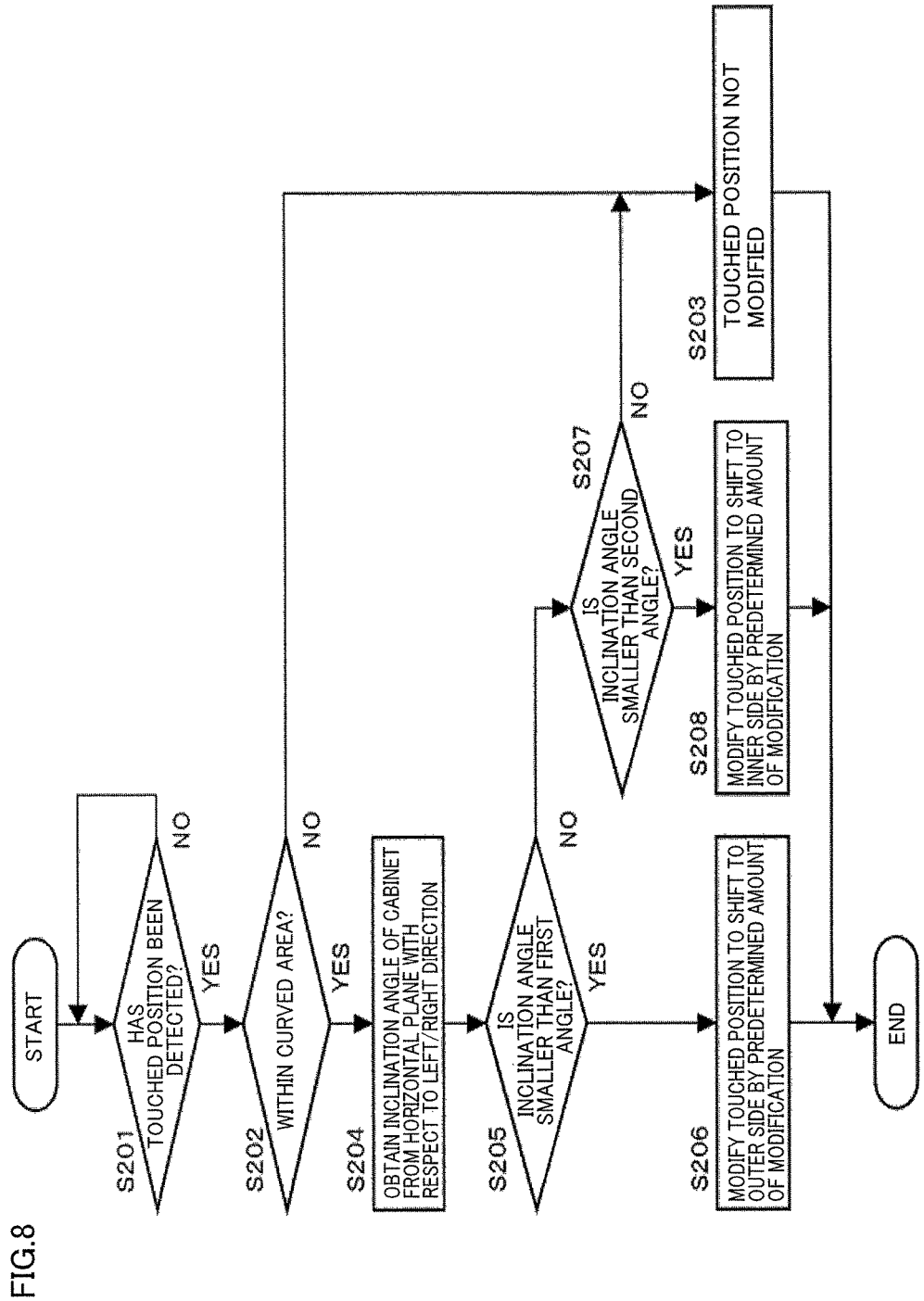
FIG. 8 is an example of a flowchart showing a process of modifying a touched position according to the second example.

FIG. 8 is an example of a flowchart showing a process of modifying a touched position according to the second example.

When a touched position has been detected by touch detection unit 14 (YES in S201), controller 11 can determine whether or not the touched position is within curved area 4a (S202). If the touched position is not within curved area 4a (NO in S202), controller 11 can terminate the touched position modification process, without modifying the touched position (S203).

If the touched position is within curved area 4a (YES in S202), controller 11 can obtain inclination angle R of cabinet 2 from the horizontal plane with respect to the left/right direction (S204). Memory 12 can store an angle table in which gravity accelerations imposed on mobile phone 1 in three directions of front/back, left/right and up/down directions are associated with inclination angle R with respect to the left/right direction. Controller 11 can acquire inclination angle R from the angle table based on the accelerations in the three directions detected by acceleration detection unit 21.

Controller 11 can determine whether or not inclination angle R is smaller than a predetermined first angle (S205). The first angle is a threshold value for determining whether cabinet 2 is not substantially inclined from the horizontal plane, and can be set at an angle close to 0 degree. If cabinet 2 is not substantially inclined from the horizontal plane, inclination angle R becomes smaller than the first angle.

When cabinet 2 is not substantially inclined from the horizontal plane, it can be presumed that the finger has approached curved area 4a in the direction toward the front surface of cabinet 2, as shown in FIG. 7A. When the finger touches curved area 4a in the direction toward the front surface of cabinet 2, actual touched position Q is displaced from target touched position P to the inner side of touch panel 4. When it is determined that inclination angle R is smaller than the first angle (YES in S205), controller 11 can modify the detected touched position so as to shift to the outer side by a predetermined amount of modification (S206). The touched position after modification is closer to a user's target touched position.

When it is determined in step S205 that inclination angle R is more than or equal to the first angle (NO in S205), controller 11 can determine whether or not inclination angle R is larger than a predetermined second angle (S207). The second angle is a threshold value for determining whether or not cabinet 2 is inclined from the horizontal plane to a somewhat large extent, and can be set at an angle larger than the first angle.

When cabinet 2 is not inclined greatly, it can be presumed that the finger has approached curved area 4a from diagonally above cabinet 2 as shown in FIG. 7C. When the finger touches curved area 4a from diagonally above cabinet 2, actual touched position Q and target touched position P are substantially identical. When it is determined that inclination angle R is less than or equal to the second angle (NO in S207), controller 11 can refrain from modifying the touched position (S203).

When cabinet 2 is inclined greatly, it can be presumed that the finger has approached curved area 4a in the direction toward the side surface of cabinet 2, as shown in FIG. 7B. When the finger touches curved area 4a in the direction toward the side surface of cabinet 2, actual touched position Q is displaced from target touched position P to the outer side of touch panel 4. When it is determined that inclination angle R is larger than the second angle (YES in S207), controller 11 can modify the detected touched position so as to shift to the inner side by the predetermined amount of modification (S208). The touched position after modification is closer to a user's target touched position.

Having modified the touched position (S206, S208), controller 11 can terminate the touched position modification process.

According to the second example, the touched position can be modified properly based on how curved area 4a has been touched, similarly to the first example.

Third Example

In the second example, by actually detecting inclination angle R of cabinet 2, it can be determined whether or not cabinet 2 is inclined from the horizontal plane with respect to the left/right direction. In a third example, it can be determined whether or not cabinet 2 is inclined based on whether or not an image captured with camera 8 includes a face image. When cabinet 2 is not inclined, it is considered that a user looks at display 3 in the direction toward the front surface as described in the second example. In this case, an image of a user's face can be captured with camera 8 facing forward. When cabinet 2 is inclined, an image of the user's face is not captured with camera 8 because the user's face is not present toward the front surface of cabinet 2.

In the third example, the state of inclination of cabinet 2 from the horizontal plane with respect to the left/right direction can be presumed based on whether or not an image captured with camera 8 includes a face image, and the direction in which the finger approaches can be further presumed based on the state of inclination of cabinet 2. The touched position can be modified based on the presumed approach direction.

Figure 9:
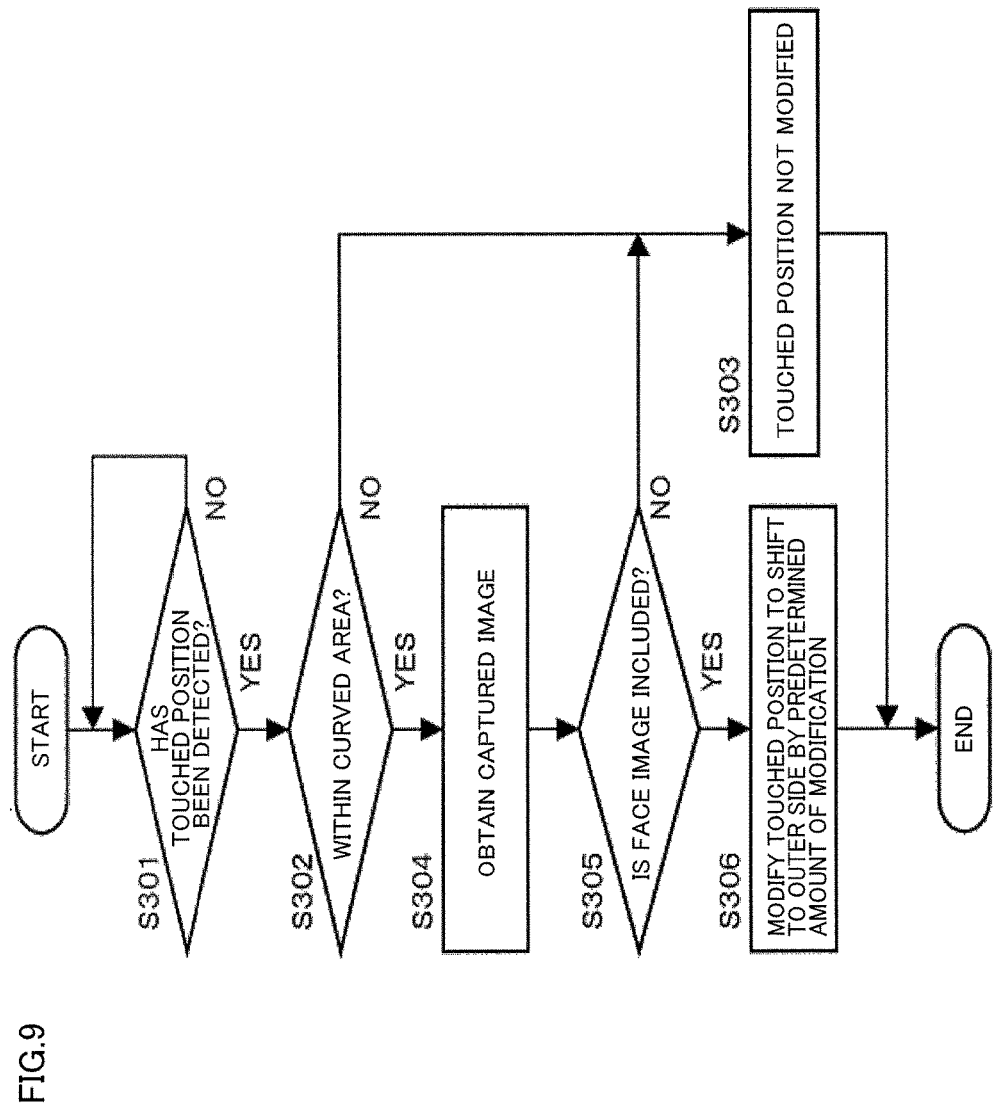
FIG. 9 is an example of a flowchart showing a process of modifying a touched position according to a third example.

FIG. 9 is an example of a flowchart showing a process of modifying a touched position according to the third example.

In the third example, camera 8 can be started up by controller 11 when the touched position modification process is started. Alternatively, the camera 8 can be started up by controller 11 when the touch position has been detected within curved area 4a. When a touched position has been detected by touch detection unit 14 (YES in S301), controller 11 can determine whether or not the touched position is within curved area 4a (S302). When the touched position is not within curved area 4a (NO in S302), controller 11 can terminate the touched position modification process, without modifying the touched position (S303).

When the touched position is within curved area 4a (YES in S302), controller 11 can acquire an image captured with camera 8 (S304). Controller 11 can determine whether or not the captured image includes a face image by executing known face recognition processing (S305). As described above, when the captured image includes a face image, it can be presumed that cabinet 2 is not substantially inclined from the horizontal plane with respect to the left/right direction. It can be presumed that the finger has approached curved area 4a in the direction toward the front surface of cabinet 2. When it is determined that the captured image includes a face image (YES in S305), controller 11 can modify the detected touched position so as to shift to the outer side by a predetermined amount of modification (S306), and can terminate the touched position modification process. The touched position after modification is closer to a user's target touched position.

When the captured image does not include a face image, it can be presumed that cabinet 2 is inclined from the horizontal plane with respect to the left/right direction. When a user inclines cabinet 2 such that an image displayed in the area of display 3 overlapping curved area 4a is readily visible, it is considered that inclination angle R is less likely to become very large rather than becoming large. This corresponds to the case as described in the <Second Example> that inclination angle R is more than or equal to the first angle but smaller than the second angle. In the third example, when the captured image does not include a face image, it can be presumed that the finger has approached curved area 4a from diagonally above cabinet 2. When it is determined that the captured image does not include a face image (NO in S305), controller 11 can refrain from modifying the touched position (S303).

In the third example, when the captured image does not include a face image, it can also be presumed that a user's face is present toward the side surface of cabinet 2, and a finger of the user has approached curved area 4a in the direction toward the side surface of cabinet 2. The touched position modification process may be changed such that, when the captured image does not include a face image (NO in S305), controller 11 modifies the detected touched position so as to shift to the inner side by the predetermined amount of modification.

According to the third example, the touched position can be modified properly based on how curved area 4a has been touched, similarly to the first example.

Fourth Example

In a fourth example, it can be determined whether or not cabinet 2 is inclined based on the details of a screen displayed on display 3. As described in the second example, when an object image to be subjected to an operation, such as an icon, is displayed in the area of display 3 overlapping curved area 4a, it is considered that cabinet 2 is likely to be inclined by a user such that the object image is readily visible.

In the fourth example, the state of inclination of cabinet 2 from the horizontal plane with respect to the left/right direction can be presumed based on whether or not an object image is displayed in the area of display 3 overlapping curved area 4a. The direction in which the finger approaches can be presumed based on the state of inclination of cabinet 2. The touched position can be modified based on the presumed approach direction.

Figure 10:
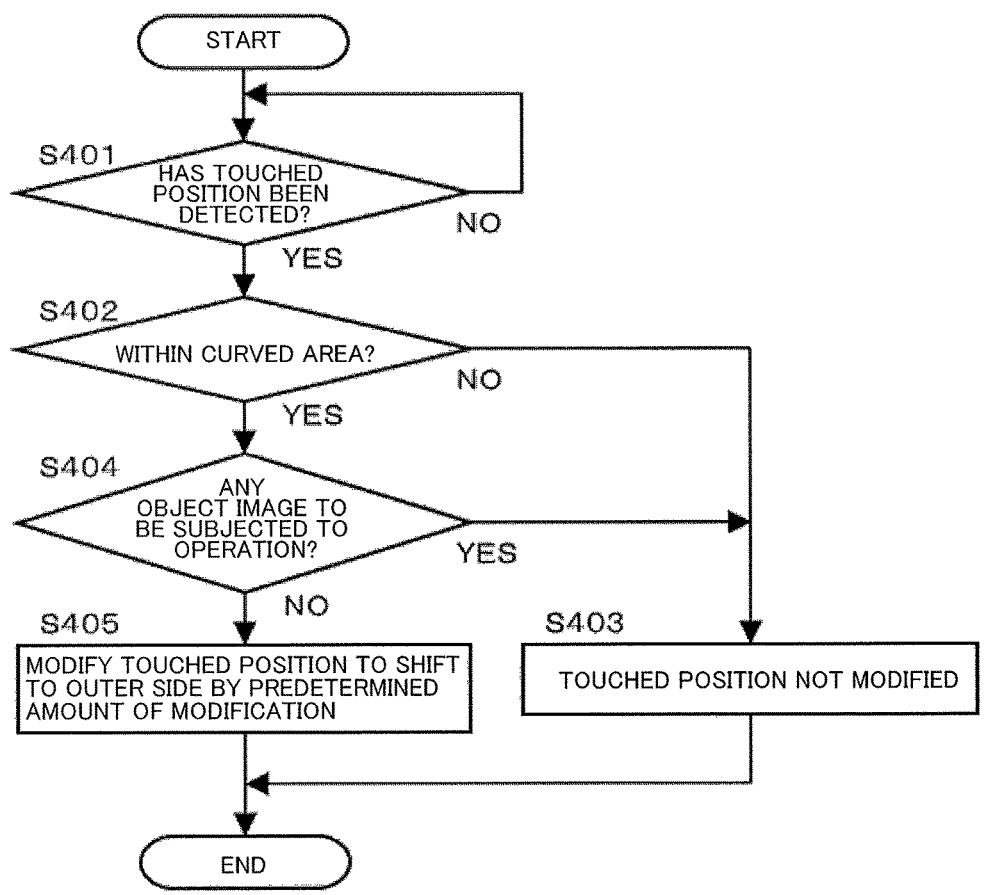
FIG. 10 is an example of a flowchart showing a process of modifying a touched position according to a fourth example.

FIG. 10 is an example of a flowchart showing a process of modifying a touched position according to the fourth example.

When a touched position has been detected by touch detection unit 14 (YES in S401), controller 11 can determine whether or not the touched position is within curved area 4a (S402). If the touched position is not within curved area 4a (NO in S402), controller 11 can terminate the touched position modification process, without modifying the touched position (S403).

If the touched position is within curved area 4a (YES in S402), controller 11 can determine whether or not an object image is displayed in the area of display 3 overlapping curved area 4a (S404). When an object image is not displayed, it can be presumed that cabinet 2 is not substantially inclined from the horizontal plane with respect to the left/right direction. It can be presumed that the finger has approached curved area 4a in the direction toward the front surface of cabinet 2. If it is determined that an object image is not displayed (NO in S404), controller 11 can modify the detected touched position so as to shift to the outer side by a predetermined amount of modification (S405), and can terminate the touched position modification process. The touched position after modification is closer to a user's target touched position.

When an object image is displayed, it can be presumed that cabinet 2 is inclined from the horizontal plane with respect to the left/right direction. It can be presumed that the finger has approached curved area 4a from diagonally above cabinet 2. If it is determined that an object image is displayed (YES in S404), controller 11 can refrain from modifying the touched position (S403).

In the fourth example, it can also be presumed that when an object image is displayed in the area of display 3 overlapping curved area 4a, a user's face is present toward the side surface of cabinet 2, and the user's finger has approached curved area 4a in the direction toward the side surface of cabinet 2. When an object image is displayed (YES in S404), the touched position modification process may be changed such that controller 11 modifies the detected touched position so as to shift to the inner side by the predetermined amount of modification.

According to the fourth example, the touched position can be modified properly based on how curved area 4a has been touched, similarly to the first example.

<Variations>

Although embodiments have been described above, various variations can be made thereto in addition to the foregoing.

For example, in the above-described embodiments, a user may adjust the amount of modification of a touched position.

Figure 11:
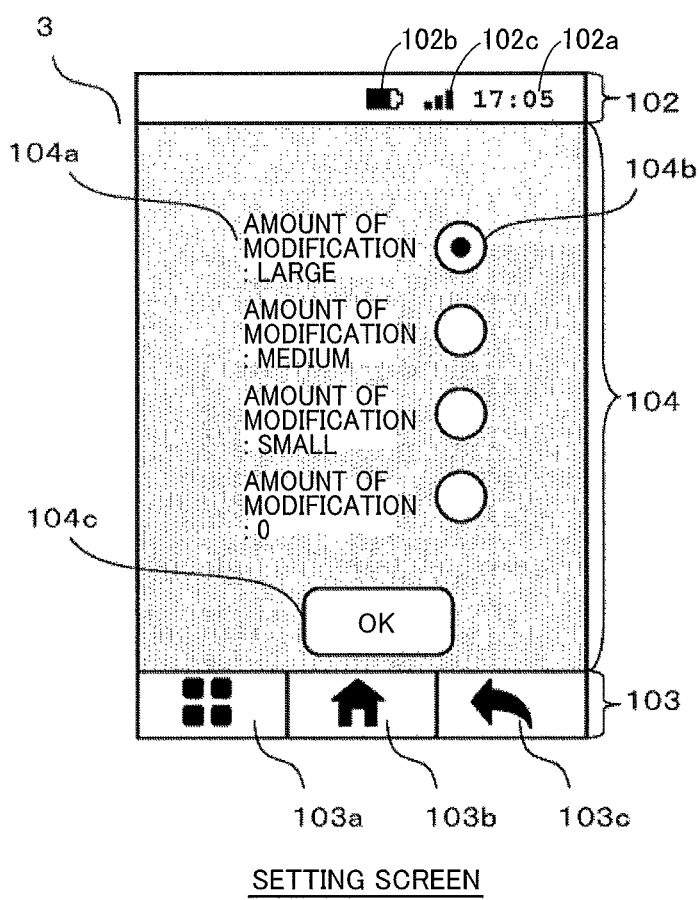
FIG. 11 shows a display with a setting screen for setting the amount of modification of a touched position displayed thereon, according to a variation.

FIG. 11 shows display 3 with a setting screen 104 for setting the amount of modification of a touched position displayed thereon.

Based on a predetermined user operation, controller 11 can cause display 3 to present setting screen 104. Setting screen 104 can include items 104a of "amount of modification: large", "amount of modification: medium", "amount of modification: small", and "amount of modification: 0", check boxes 104b corresponding to respective items 104a, and a decision object 104c. When a user wishes to modify a touched position, he/she can select a desired amount of modification from among the three different amounts of modification: large; medium; and small, by making a touch operation on corresponding check box 104b. When the user does not wish to modify a touched position, he/she can perform a touch operation on corresponding check box 104b to select making the amount of modification zero. When a touch operation is performed on decision object 104c, controller 11 can set the amount of modification corresponding to check box 104b in which a check mark has been entered as the amount of modification to be used in the touched position modification process.

Figure 12A:
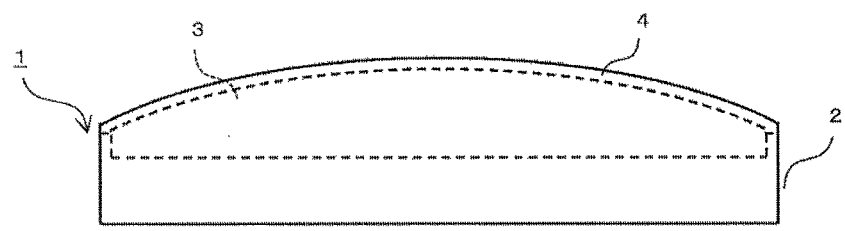
FIGS. 12A to 12C each show how a touch panel of a mobile phone according to a variation is curved.
Figure 12B:
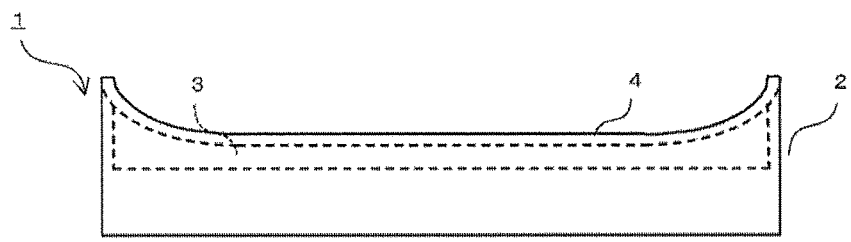
Figure 12C:
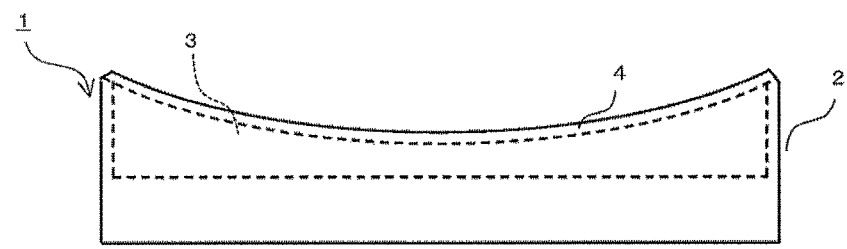

In the above-described embodiments, touch panel 4 including curved area 4a at each of the both ends can be used for mobile phone 1, curved area 4a being curved so as to be lowered from the inner side toward the outer side. This is not a limitation, but touch panel 4 including a curved area of convex shape on the whole surface may be used for mobile phone 1 as shown in FIG. 12A, for example. As shown in FIG. 12B, touch panel 4 including a curved area at each of the both ends may be used for mobile phone 1, curved area 4a being curved so as to be raised from the inner side toward the outer side. As shown in FIG. 12C, touch panel 4 including a curved area of concave shape on the whole surface may be used for mobile phone 1. With the configurations shown in FIGS. 12A and 12C, the step (S105, S202, S302, S402) of determining a curved area is eliminated from the touched position modification process. With the configurations shown in FIGS. 12B and 12C, steps S109 to S111 in the touched position modification process shown in FIG. 6 remain unchanged, but when the direction of movement of closest position X is from the inner side to the outer side, it will be presumed that a finger has approached cabinet 2 in the direction toward the side surface thereof, and when the direction of movement of closest position X is from the outer side to the inner side, it will be presumed that a finger has approached cabinet 2 in the direction toward the front surface thereof. With the configurations shown in FIGS. 12B and 12C, steps S206 and S208 are exchanged in the touched position modification process shown in FIG. 8, and in step S306 of the touched position modification process shown in FIG. 9 and step S405 of the touched position modification process shown in FIG. 10, a touched position can be modified so as to shift to the inner side by a predetermined amount of modification.

The above-described embodiments are applied to a smartphone type mobile phone. This is not a limitation, but the above-described embodiments may be applied to other types of mobile phones, such as a bar phone, a flip phone, a slide phone, and the like.

The touched position is modified in the above-described embodiments based on the direction in which a finger approaches touch panel 4, but the finger is not a limitation. When another tool, such as a stylus pen, that can indicate a touched position on touch panel 4 is used, the touched position may be modified based on the direction in which the tool approaches touch panel 4. A finger or the above-mentioned tool that can indicate a touched position on the touch panel may be inclusively expressed as a touched position indicator.

The above-described embodiments are not limited to mobile phones, but can be applied to various types of portable devices, such as a PDA (Personal Digital Assistant), a tablet PC, a digital book terminal, a portable music player, a portable television, a portable navigation system, and the like.

It should be understood that the embodiments disclosed herein are illustrative and non-restrictive in every respect. The scope of the present disclosure is defined by the claims not by the description above, and is intended to include any modification within the meaning and scope equivalent to the terms of the claims.

(Other Aspects)

In the portable device according to the present disclosure, the touch panel may be configured to detect a position at which a finger has approached the curved area and a degree of proximity of the finger at the position. In this case, an approach direction determination unit can sequentially acquire a closest position at which the finger is closest to the curved area while the finger is approaching the curved area, to thereby determine, as the determination of the direction, a movement of the closest position. A position modification unit can modify the touched position based on the movement of the closest position.

With such a configuration, the curved area may be an area curved so as to be lowered from the inner side toward the outer side of the touch panel. In this case, the approach direction determination unit can determine a direction of the movement of the closest position. When it is determined that the direction of the movement is a direction from the inner side toward the outer side of the touch panel, the position modification unit can modify the touched position to shift to the outer side.

With such a configuration, when it is determined by the approach direction determination unit that the direction of the movement is a direction from the outer side toward the inner side of the touch panel, the position modification unit can modify the touched position to shift to the inner side.

With such a configuration, the approach direction determination unit may be configured to determine the amount of movement of the closest position. In this case, when it is determined by the approach direction determination unit that the amount of movement is smaller than a predetermined amount, the position modification unit can refrain from modifying the touched position.

The portable device according to the present disclosure may be configured to further include a posture detection unit configured to detect a posture of a housing. In this case, the approach direction determination unit can determine, as a determination of the direction, an inclination angle of the housing from a horizontal plane in a direction in which the curved area is curved based on a detection result obtained by the posture detection unit. The position modification unit can modify the touched position based on the inclination angle.

The portable device according to the present disclosure may be configured to further include an image capturing unit configured to capture an image in a direction which a front surface of a housing is directed. In this case, the approach direction determination unit can determine, as a determination of the direction, whether or not the image captured with the image capturing unit includes a face image. The position modification unit can modify the touched position based on whether the face image is included.

In the portable device according to the present disclosure, the approach direction determination unit may be configured to determine, as a determination of the direction, whether or not an object image to be subjected to an operation is displayed in an area of the display overlapping the curved area. In this case, the position modification unit can modify the touched position based on whether the object image is displayed.

A second aspect of the present disclosure relates to a method of modifying a touched position by which a touched position touched with a finger can be modified. The touched position is detected by a touch panel. The touch panel includes a curved area at least partly. The method includes, when the touched position is within the curved area, determining an approach direction from which the finger has approached the curved area, and modifying the touched position on the curved area based on the approach direction.

A third aspect of the present disclosure relates to a portable device. The portable device of the third aspect includes a display located on a front surface of a housing, a touch panel overlapping the display, capable of detecting a touched position touched with a finger, and including a curved area at least partly, and a position modification unit capable of, when the touched position is within the curved area, modifying the touched position in the curved area based on the approach direction from which the finger has approached the curved area.

The term "unit" as used herein refers to known structures such as hardware, firmware, non-transitory computer-readable media that stores computer-executable instructions, or any combination of these elements, for performing the associated functions described herein. Additionally, various units can be discrete units; however, as would be apparent to one of ordinary skill in the art, two or more units may be combined to form a single unit that performs the associated functions according to various embodiments of the invention. Conversely, a single unit may be divided into two or more units that perform respective associated functions according to various embodiments of the invention.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. A portable device comprising;
a display;
a touch panel including a flat area and a curved area; and
at least one processor configured to
determine a direction of approach of an object toward the touch panel prior to the object touching a touch position on the touch panel,
determine when the touched position on the touch panel is within the curved area, and
when it is determined that the touched position is within the curved area, modify the touched position based on the determined direction of approach, wherein if the determined direction of approach is in a direction substantially perpendicular to a plane of the flat area, the touched position is modified so as to indicate a target position that is further away from the flat area within the curved area compared to the touched position, and if the determined direction of approach is in a direction substantially parallel to the plane of the flat area, the touched position is modified so as to indicate a target position that is closer to the flat area within the curved area compared to the touched position.

2. The portable device according to claim 1, wherein
the touch panel is configured to detect a position at which the touched position indicator has approached the curved area and a degree of proximity of the touched position indicator at the position, and
the at least one processor is configured to
determine the direction by sequentially acquiring a closest position at which the touched position indicator is closest to the curved area while the touched position indicator is approaching the curved area and determining a movement of the closest position.

3. The portable device according to claim 2, wherein
the curved area is an area curved so as to be lowered from the inner side toward the outer side of the touch panel, and
the at least one processor is configured to
determine a direction of the movement of the closest position, and
when it is determined that the direction of the movement is a direction from the inner side toward the outer side of the touch panel, modify the touched position to shift to the outer side.

4. The portable device according to claim 3, wherein when it is determined that the direction of the movement is a direction from the outer side toward the inner side of the touch panel, the at least one processor is configured to modify the touched position to shift to the inner side.

5. The portable device according to claim 2, wherein the at least one processor is configured to
determine the amount of movement of the closest position, and
when it is determined that the amount of movement is smaller than a predetermined amount, refrain from modifying the touched position.

6. The portable device according to claim 1, further comprising a posture detection unit configured to detect a posture of a housing, wherein
the at least one processor is configured to determine the direction by determining an inclination angle of the housing from a horizontal plane based on a detection result obtained by the posture detection unit.

7. The portable device according to claim 1, further comprising an image capturing unit configured to capture an image in a direction which a front surface of a housing is directed, wherein the at least one processor is configured to
determine the direction by determining whether or not the image captured with the image capturing unit includes a face image.

8. The portable device according to claim 1, wherein the at least one processor is configured to
determine the direction by determining whether or not an object image to be subjected to an operation is displayed in an area of the display overlapping the curved area.

9. A touched position modification method for modifying a touched position touched by an object, the touched position being detected by a touch panel, the touch panel including a flat area and a curved area, the method including:
determining a direction of approach of the object toward the touch panel prior to the object touching the touched position on the touch panel,
determining when the touched position on the touch panel is within the curved area, and
when the touched position is within the curved area, modifying the touched position based on the determined direction, wherein if the determined direction of approach is in a direction substantially perpendicular to a plane of the flat area, the touched position is modified so as to indicate a target position that is further away from the flat area within the curved area compared to the touched position, and if the determined direction of approach is in a direction substantially parallel to the plane of the flat area, the touched position is modified so as to indicate a target position that is closer to the flat area within the curved area compared to the touched position.

10. A portable device comprising:
a display;
a touch panel including a flat area and a curved area; and
at least one processor configured to, determine a direction of approach of an object as it moves toward a touched position on the touch panel, when a touched position on the touch panel is within the curved area, determine a target position different from the touched position based on the determined direction of approach, wherein if the determined direction, of approach is in a direction substantially perpendicular to a plane of the flat area, the target position is determined to be further away from the flat area within the curved area compared to the touched position, and if the determined direction of approach is in a direction substantially parallel to the plane of the flat area, the target position is determined to be closer to the flat area within the curved area compared to the touched position.

* * * * *